United States Patent
Watanabe et al.

(10) Patent No.: US 12,497,887 B2
(45) Date of Patent: Dec. 16, 2025

(54) ACCELERATION OF SUBSURFACE SIMULATION USING FILTERED GRID CONNECTIVITY GRAPH

(71) Applicants: Chevron U.S.A. Inc., San Ramon, CA (US); Schlumberger Technology Corporation, Sugar Land, TX (US)

(72) Inventors: Shingo Watanabe, Houston, TX (US); Jostein Natvig, Asker (NO); Pavel Tomin, Houston, TX (US)

(73) Assignees: Chevron U.S.A. Inc., San Ramon, CA (US); Schlumberger Technology Corporation, Sugar Land, TX (US)

( * ) Notice: Subject to any disclaimer, the term of this patent is extended or adjusted under 35 U.S.C. 154(b) by 1076 days.

(21) Appl. No.: 17/506,347

(22) Filed: Oct. 20, 2021

(65) Prior Publication Data
US 2023/0119861 A1 Apr. 20, 2023

(51) Int. Cl.
*E21B 47/00* (2012.01)
*E21B 43/00* (2006.01)
*G01V 99/00* (2024.01)

(52) U.S. Cl.
CPC .............. *E21B 47/00* (2013.01); *E21B 43/00* (2013.01); *E21B 2200/20* (2020.05); *G01V 99/00* (2013.01)

(58) Field of Classification Search
CPC ...... E21B 47/00; E21B 2200/20; E21B 43/00; G01V 99/00
USPC .......................................................... 703/10
See application file for complete search history.

(56) References Cited

U.S. PATENT DOCUMENTS

| | | |
|---|---|---|
| 6,823,297 B2 | 11/2004 | Jenny |
| 7,546,229 B2 | 6/2009 | Jenny |
| 7,765,091 B2 | 7/2010 | Lee |
| 8,204,726 B2 | 6/2012 | Lee |
| 8,650,016 B2 | 2/2014 | Lunati |
| 11,156,742 B2 | 10/2021 | Bratvedt |
| 2007/0027666 A1* | 2/2007 | Frankel ............. E21B 49/00 703/10 |

(Continued)

FOREIGN PATENT DOCUMENTS

| | | |
|---|---|---|
| EP | 2960430 | 12/2015 |
| WO | 2011100002 | 8/2011 |

(Continued)

OTHER PUBLICATIONS

P. Vaněk, J. Mandel, M. Brezina, Algebraic multigrid by smoothed aggregation for second and fourth order elliptic problems, Computing 56 (3) (1996) 179-196, https://doi.org/10.1007/BF02238511.

(Continued)

*Primary Examiner* — John E Johansen
(74) *Attorney, Agent, or Firm* — Esplin & Associates, PC

(57) ABSTRACT

A subsurface representation may define subsurface configuration of a subsurface region. A grid connectivity graph for the subsurface representation may include (1) nodes that represent cells within the subsurface representation, and (2) edges between the nodes that represent connectivity between the cells within the subsurface representation. The grid connectivity graph may be filtered to remove edges that do not satisfy a connectivity criterion. The filtered grid connectivity graph may be used to compute a linear solver preconditioner that improves the performance of the subsurface simulation.

20 Claims, 10 Drawing Sheets

(56) References Cited

U.S. PATENT DOCUMENTS

2008/0208539 A1* 8/2008 Lee ................. G01V 1/301
                  703/1
2018/0137223 A1* 5/2018 Fung ................ E21B 43/16

FOREIGN PATENT DOCUMENTS

| WO | WO-2011100002 A1 * | 8/2011 | ............ G01V 99/00 |
| WO | 2012115689 | 8/2012 | |
| WO | WO-2018005214 A1 * | 1/2018 | ............ G06F 30/20 |

OTHER PUBLICATIONS

O. Møyner, K.-A. Lie, A multiscale restriction-smoothed basis method for high contrast porous media represented on unstructured grids, J. Comput. Phys. 304 (2016) 46-71, https://doi.org/10.1016/j.jcp.2015.10.010.

Bosma, S.B.M., Klevtsov, S., Møyner, O., Castelletto, N.Hide, Enhanced multiscale restriction-smoothed basis (MsRSB) preconditioning with applications to porous media flow and geomechanics, J. Comput. Phys. 428 (2021) 109934 https://doi.org/10.1016/j.jcp.2020.109934.

Shingo Watanabe, et al.; "Strongly Coupled Prolongation in Multiscale Pressure Solver for High-Contrast Heterogeneous Reservoir Simulation" SPE International; SPE-212229-MS; 2023 (25 pages).

Watanabe, Shingo, Sakai, Takuto, and Clair Jensen. "A Physics-Based Coarsening Strategy in Multiscale Pressure Solver for Fractured Reservoir Simulation." Paper presented at the SPE Reservoir Simulation Conference, Galveston, Texas, USA, Mar. 2025 (26 pages).

* cited by examiner coarse subsurface representation 602  coarse subsurface representation 604

ACCELERATION OF SUBSURFACE SIMULATION USING FILTERED GRID CONNECTIVITY GRAPH

FIELD

The present disclosure relates generally to the field of accelerating reservoir simulation using filtered grid connectivity graph.

BACKGROUND

Running simulations of a subsurface region (e.g., a reservoir) may be computationally expensive, such as requiring high processing power and/or long computational time. For example, a simulation of a subsurface region using a detailed subsurface representation may take days to weeks to run.

SUMMARY

This disclosure relates to accelerating reservoir simulation. Grid connectivity graph information for a subsurface representation and/or other information may be obtained. The subsurface representation may include cells that define subsurface configuration of a subsurface region. The grid connectivity graph information may define a grid connectivity graph for the subsurface representation. The grid connectivity graph may include nodes representing the cells within the subsurface representation and edges representing connectivity between the cells within the subsurface representation. The grid connectivity graph may be filtered based on a connectivity criterion and/or other information. Simulation of the subsurface region may be facilitated based on the filtered grid connectivity graph and/or other information.

A system for accelerating reservoir simulation may include one or more electronic storage, one or more processors and/or other components. The electronic storage may store grid connectivity graph information, information relating to a subsurface region, information relating to a subsurface representation, information relating to cells within the subsurface representation, information relating to connectivity between the cells within the subsurface representation, information relating to a grid connectivity graph, information relating to a connectivity criterion, information relating to filtering of the grid connectivity graph, information relating to a filtered grid connectivity graph, information relating to simulation of the subsurface region, and/or other information.

The processor(s) may be configured by machine-readable instructions. Executing the machine-readable instructions may cause the processor(s) to facilitate accelerating reservoir simulation. The machine-readable instructions may include one or more computer program components. The computer program components may include one or more of a graph component, a filter component, a simulation component, and/or other computer program components.

The graph component may be configured to obtain grid connectivity graph information for a subsurface representation and/or other information. The subsurface representation may include cells that define subsurface configuration of a subsurface region. The grid connectivity graph information may define a grid connectivity graph for the subsurface representation. The grid connectivity graph may include nodes representing the cells within the subsurface representation and edges representing connectivity between the cells within the subsurface representation. In some implementations, the connectivity between the cells represented by the edges of the grid connectivity graph may include ability of fluid to flow between the cells.

The filter component may be configured to filter the grid connectivity graph. The grid connectivity graph may be filtered based on a connectivity criterion and/or other information. In some implementations, filtering of the grid connectivity graph based on the connectivity criterion may include removal of one or more of the edges of the grid connectivity graph that does not satisfy the connectivity criterion.

In some implementations, the connectivity criterion may be defined by transmissibility values between the cells within the subsurface representation and/or other information.

The simulation component may be configured to facilitate simulation of the subsurface region. The simulation of the subsurface region may be facilitated based on the filtered grid connectivity graph and/or other information.

In some implementations, facilitation of the simulation of the subsurface region based on the filtered grid connectivity graph may include generation of a coarse subsurface representation for the subsurface region based on the filtered grid connectivity graph and/or other information.

In some implementations, the facilitation of the simulation of the subsurface region based on the filtered grid connectivity graph may further include generation of support regions for the coarse subsurface representation based on the filtered grid connectivity graph and/or other information.

In some implementations, the facilitation of the simulation of the subsurface region based on the filtered grid connectivity graph may further include determination of basis function based on the filtered grid connectivity graph and/or other information.

In some implementations, the facilitation of the simulation of the subsurface region based on the filtered grid connectivity graph may further include determination of a prolongation operator based on the basis function and/or other information.

In some implementations, the facilitation of the simulation of the subsurface region based on the filtered grid connectivity graph may further include determination of a linear solver preconditioner based on the prolongation operator and/or other information.

In some implementations, the facilitation of the simulation of the subsurface region based on the filtered grid connectivity graph may further include improvement of a convergence rate for the simulation based on the linear solver preconditioner and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to accelerating reservoir simulation. A subsurface representation may define subsurface configuration of a subsurface region. A grid connectivity graph for the subsurface representation may include (1) nodes that represent cells within the subsurface representation, and (2) edges between the nodes that represent connectivity between the cells within the subsurface representation. The grid connectivity graph may be filtered to remove edges that do not satisfy a connectivity criterion. The filtered grid connectivity graph may be used to compute a linear solver preconditioner that improves the performance of the subsurface simulation.

Figure 1:
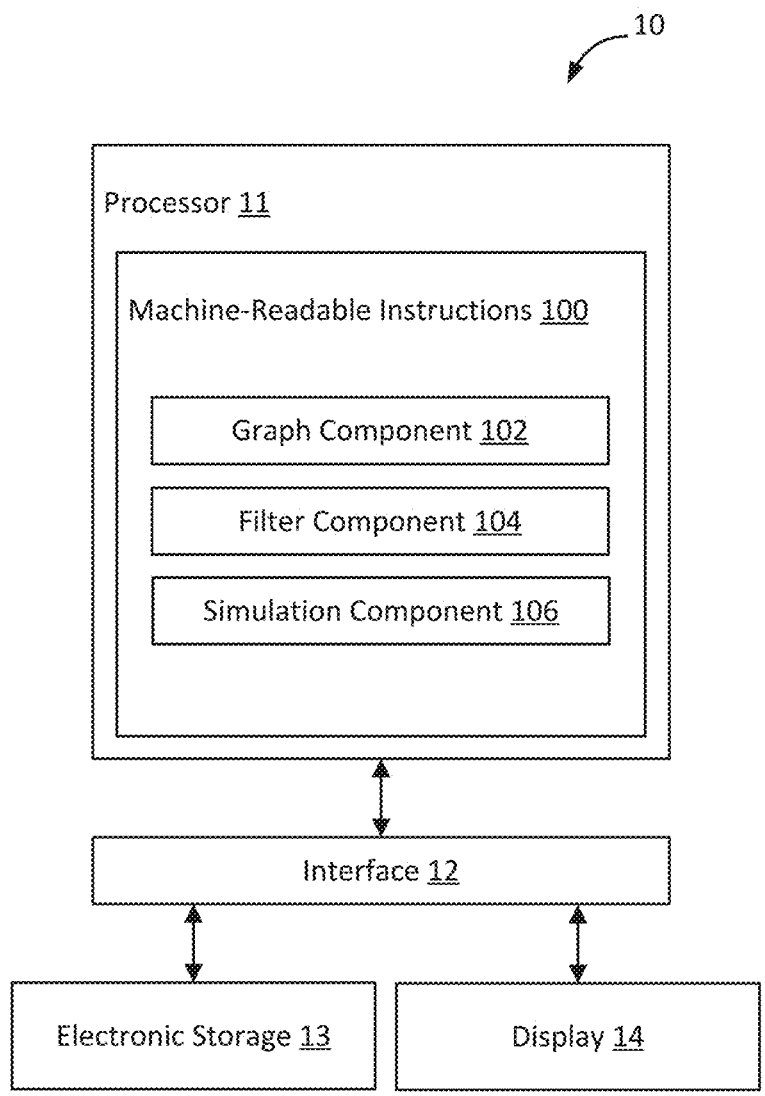
FIG. 1 illustrates an example system for accelerating reservoir simulation.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Grid connectivity graph information for a subsurface representation and/or other information may be obtained by the processor 11. The subsurface representation may include cells that define subsurface configuration of a subsurface region. The grid connectivity graph information may define a grid connectivity graph for the subsurface representation. The grid connectivity graph may include nodes representing the cells within the subsurface representation and edges representing connectivity between the cells within the subsurface representation. The grid connectivity graph may be filtered by the processor 11 based on a connectivity criterion and/or other information. Simulation of the subsurface region may be facilitated by the processor 11 based on the filtered grid connectivity graph and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store grid connectivity graph information, information relating to a subsurface region, information relating to a subsurface representation, information relating to cells within the subsurface representation, information relating to connectivity between the cells within the subsurface representation, information relating to a grid connectivity graph, information relating to a connectivity criterion, information relating to filtering of the grid connectivity graph, information relating to a filtered grid connectivity graph, information relating to simulation of the subsurface region, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present information relating to a subsurface region, information relating to a subsurface representation, information relating to cells within the subsurface representation, information relating to connectivity between the cells within the subsurface representation, information relating to a grid connectivity graph, information relating to a connectivity criterion, information relating to filtering of the grid connectivity graph, information relating to a filtered grid connectivity graph, information relating to simulation of the subsurface region, and/or other information. For instance, the display 14 may present a view of a filtered grid connectivity graph and/or simulation result of a subsurface region using the filtered grid connectivity graph.

A subsurface representation (e.g., a computer-generated model of a subsurface region) may include grid representation of subsurface properties, such as rock permeability and porosity. Based on the scale resolution of the computational grids, the grid numbers for subsurface simulation (e.g., reservoir simulation) may range from millions to tens and hundreds of millions. The most detailed computational grids require greater computational resources (e.g., processing power, memory, computational time) when used to perform the simulations. For example, a reservoir simulation using a detailed computational grid may require days or weeks of computational time.

Simulation of a subsurface region may utilize different scales of subsurface representations (e.g., different scales of computational grids). For example, simulation of a subsurface region may utilize fine-scale grids (original simulation grids) and coarse-scale grids (amalgamation of the fine-scale grids with coarser spatial resolution).

Current disclosure enables accelerated simulation of a subsurface region by using a filtered grid connectivity graph. The grid connectivity graph of a subsurface representation is filtered to remove certain edges between nodes of the grid connectivity graph. For example, the connectivity between cells of the subsurface representation may be analyzed to identify connections that are strong versus weak. The grid connectivity graph may be filtered using the strength of the connections to remove edges that represent weak connections while retaining edges that represent strong connections.

The filtered grid connectivity graph may be utilized to accelerate the simulation of the subsurface region. For example, the filtered grid connectivity graph may be utilized to construct coarse subsurface representations (e.g., coarse grids) for a multiscale pressure solver. The coarse subsurface representations may be used a prolongation operator (e.g., in Restriction-Smoothed Basis functions method). The modified coarse subsurface representation generation and the basis function computation disclosure herein may provide a significant improvement of the multiscale pressure solver convergence and result in faster simulation of the subsurface region, especially for high-contrast heterogeneous reservoir simulations.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate accelerating reservoir simulation. The machine-readable instructions 100 may include one or more computer program components. The machine-readable instructions 100 may include a graph component 102, a filter component 104, a simulation component 106, and/or other computer program components.

The graph component 102 may be configured to obtain grid connectivity graph information for a subsurface representation and/or other information. Obtaining grid connectivity graph information may include one or more of accessing, acquiring, analyzing, determining, examining, identifying, loading, locating, opening, receiving, retrieving, reviewing, selecting, storing, and/or otherwise obtaining the grid connectivity graph information. The graph component 102 may obtain grid connectivity graph information from one or more locations. For example, the graph component 102 may obtain grid connectivity graph information from a storage location, such as the electronic storage 13, electronic storage of a device accessible via a network, and/or other locations. The graph component 102 may obtain grid connectivity graph information from one or more hardware components (e.g., a computing device) and/or one or more software components (e.g., software running on a computing device). In some implementations, the grid connectivity graph information may be obtained from one or more users. For example, a user may interact with a computing device to input the grid connectivity graph information (e.g., identify which grid connectivity graph will be used, identify a subsurface representation for which a grid connectivity graph is obtained).

A subsurface representation may refer to a computer-generated representation of a subsurface region, such as a one-dimensional, two-dimensional and/or three-dimensional model of the subsurface region. A subsurface region may refer to a part of earth located beneath the surface/located underground. A subsurface region may refer to a part of earth that is not exposed at the surface of the ground. A subsurface region may be defined in a single dimension (e.g., a point, a line) or in multiple dimensions (e.g., a surface, a volume). For example, a subsurface region may include/be a basin and/or a seismic volume.

A subsurface representation may be representative of a subsurface volume sampled by one or more wells. A subsurface representation may be representative of the depositional environment of wells. A subsurface representation may include geologically plausible arrangement of rock obtained from a modeling process (e.g., stratigraphic forward modeling process).

A subsurface representation may define subsurface configuration at different locations within a subsurface region. Subsurface configuration may refer to attribute, quality, and/or characteristics of a subsurface region. Subsurface configuration may refer to physical arrangement of materials (e.g., subsurface elements) within a subsurface region. Examples of subsurface configuration may include types of subsurface materials, characteristics of subsurface materials (e.g., rock porosity, permeability), compositions of subsurface materials, arrangements/configurations of subsurface materials, physics of subsurface materials, and/or other subsurface configuration. For instance, subsurface configuration may include and/or define types, shapes, and/or properties of materials and/or layers that form subsurface (e.g., geological, petrophysical, geophysical, stratigraphic) structures.

In some implementations, the subsurface configuration of a subsurface representation may be simulated by and/or through one or more subsurface models. A subsurface model may refer to a computer model (e.g., program, tool, script, function, process, algorithm) that generates subsurface representations. A subsurface model may simulate subsurface configuration within a region underneath the surface (subsurface region).

An example of a subsurface model is a computational stratigraphy model. A computational stratigraphy model may refer to a computer model that simulates depositional and/or stratigraphic processes on a grain size scale while honoring physics-based flow dynamics. A computational stratigraphy model may simulate rock properties, such as velocity and density, based on rock-physics equations and assumptions. Input to a computational stratigraphy model may include information relating to a subsurface region to be simulated. For example, input to a computational stratigraphy model may include paleo basin floor topography, paleo flow and sediment inputs to the basin, and/or other information relating to the basin. In some implementations, input to a computational stratigraphy model may include one or more paleo geologic controls. Output of a computational stratigraphy model may include one or more subsurface representations. A subsurface representation generated by a computational stratigraphy model may be referred to as a computational stratigraphy model representation.

A subsurface model may include a forward stratigraphic model. A forward stratigraphic model may be an event-based model, a process mimicking model, a reduced physics-based model, and/or a fully physics-based model (e.g., fully based on physics of flow and sediment transport). A forward stratigraphic model may simulate one or more sedimentary processes that recreate the way stratigraphic successions develop and/or are preserved. The forward stratigraphic model may be used to numerically reproduce the physical processes that eroded, transported, deposited, and/or modified the sediments over variable time periods. In a forward modelling approach, data may not be used as the anchor points for facies interpolation or extrapolation. Rather, data may be used to test and validate the results of the simulation. Stratigraphic forward modelling may be an iterative approach, where input parameters have to be modified until the results are validated by actual data. Usage of other subsurface models and other subsurface representations are contemplated.

In some implementations, the subsurface configuration of a subsurface representation may be defined by values of one or more subsurface properties as a function of position within the subsurface region/subsurface representation. A subsurface property may refer to a particular attribute, quality, and/or characteristics of a subsurface region. For instance, the subsurface configuration of a subsurface region may be defined by values of multiple subsurface properties at different spatial positions within the subsurface region/subsurface representation. For example, the subsurface configuration of a subsurface region may be defined by values of sand thickness, sand quality, sand volume, and/or other sand characteristics at different spatial positions within the subsurface region/subsurface representation. Other subsurface properties are contemplated.

In some implementations, a subsurface representation may be representative of a subsurface region of interest. For example, the subsurface configuration defined by a subsurface representation may be representative of the subsurface configuration of a reservoir of interest and/or representative of an environment of deposition of interest. Other subsurface regions of interest are contemplated. In some implementations, a subsurface representation may be scaled in area size and thickness to match a subsurface region of interest. For example, lateral size and/or vertical depth of a subsurface representation may be changed to be comparable to the size and thickness of a subsurface region of interest.

A subsurface representation may include cells that define the subsurface configuration of a subsurface region. A subsurface representation may be composed of numerous cells that define the subsurface configuration of a subsurface region. Different cells of a subsurface representation may correspond to different locations in a subsurface region. For example, a subsurface representation may include a simulation grid composed of cells that individually define the subsurface configuration of a subsurface region at different locations.

The grid connectivity graph information may define a grid connectivity graph for a subsurface representation. A grid connectivity graph for a subsurface representation may refer to graph that represents connectivity of cells within the subsurface representation using nodes and edges. A grid connectivity graph may include nodes and edges. The nodes of the grid connectivity graph may represent cells within the subsurface representation. The edges of the grid connectivity graph may represent connectivity between the cells within the subsurface representation. For example, an edge that exist between two nodes in the grid connectivity graph may indicate that connectivity exists between the two corresponding cells in the subsurface representation. No edge existing between two nodes in the grid connectivity graph may indicate that connectivity does exists between the two corresponding cells in the subsurface representation. By using edges between the nodes, the grid connectivity graph may define how cells within the subsurface representation are connected to other cells.

Connectivity between cells in the subsurface representation may refer to a state and/or an extent to which the cells in the subsurface representation are connected. Connectivity between cells in the subsurface representation may refer to a state and/or an extent to which material may move between the cells. For example, the connectivity between the cells represented by the edges of the grid connectivity graph may include ability of fluid to flow between the cells. For instance, an edge that exists between two nodes in the grid connectivity graph may indicate that the cells have a shared space through which fluid may flow across from one cell to the other cell (e.g., the cells are strongly coupled neighbors). In some implementations, the connectivity between the cells in the subsurface representation may include and/or be determined based on geometry, permeability, fluid properties, and/or other information. Other types of connectivity between cells are contemplated.

The grid connectivity graph information may define a grid connectivity graph for a subsurface representation by including information that describes, delineates, identifies, is associated with, quantifies, reflects, sets forth, and/or otherwise defines one or more of content, quality, attribute, feature, and/or other aspects of the grid connectivity graph. For example, the grid connectivity graph information may define a grid connectivity graph for a subsurface representation by including information that makes up the content (e.g., nodes, edges) of the grid connectivity graph and/or information that is used to identify/determine the content of the grid connectivity graph. Other types of grid connectivity graph information are contemplated.

The filter component 104 may be configured to filter the grid connectivity graph. Filtering the grid connectivity graph may include modifying the grid connectivity graph to generate a filtered grid connectivity graph. Filtering the grid connectivity graph may include modifying (e.g., adding, removing, changing location of) nodes and/or edges of the grid connectivity graph. For example, filtering the grid connectivity graph may include removing one or more edges of the grid connectivity graph.

The grid connectivity graph may be filtered based on a connectivity criterion and/or other information. For example, the grid connectivity graph may be filtered based on the connectivity criterion to remove one or more of the edges of the grid connectivity graph that does not satisfy the connectivity criterion (e.g., removal of edges between nodes that represent non-strongly coupled neighbors). A connectivity criterion may refer to a principle or a standard by which connectivity between cells in the subsurface representation are analyzed, judged, measured, and/or otherwise decided for potential removal of the corresponding edges from the grid connectivity graph. A connectivity criterion may provide a principle or a standard relating to connectivity between the cells to determine whether edges should be removed from the grid connectivity graph. For example, a connectivity criterion may provide a threshold amount of connectivity below which the edges (e.g., representing weak connections/couplings) are to be removed from the grid connectivity graph. Such filtering of the grid connectivity graph may result in weakly coupled connection in the grid connectivity graph being disconnected.

The connectivity criterion may be defined by strength and/or weakness of connectivity between the cells. The connectivity criterion may be defined by one or more subsurface configuration of the cells, such as transmissibility, permeability, geometry (e.g., geometry of shared space between cells, geometry of grid pore volume), and/or pressure matrix values. For example, the connectivity criterion may be defined by transmissibility values between the cells within the subsurface representation and/or other information. For instance, the connectivity criterion may be defined as set forth below using the transmissibility values ($t_{ij}$) between grid i and j to filter the grid connections:

$$t_{ij}^F = \begin{cases} t_{ij} & \text{if } j \in N_i^j(\varepsilon) \\ 0 & \text{otherwise} \end{cases} \quad (1)$$

$$\text{where if } i \neq j, t_{ii} = -\sum_{j=1, j\neq i}^{n_i} t_{ij} \text{ and} \quad (2)$$

$$N_i^j(\varepsilon) = \{j : |t_{ij}| \geq \varepsilon \sqrt{t_{ii} t_{jj}}\} \cup \{i\} \quad (3)$$

In the above, equation (3) may provide a definition of sufficient connectivity (e.g., strongly coupled neighbors) to remain in the grid connectivity graph. The epsilon value ($\varepsilon$) may be a threshold value to determine the strong connections. The value may be bounded between 0 and 1 by the constrain equation (2). If the connection between the grid cells i and j satisfies the definition of sufficient connectivity given by equation (3), the corresponding edge may be retained in the grid connectivity graph. If the connection between the grid cells i and j does not the definition of sufficient connectivity given by equation (3), the corresponding edge may be removed from the grid connectivity graph. Use of other definitions of sufficient connectivity is contemplated.

In implementations, the definition of sufficient connectivity may be symmetrical. That is, symmetry may be required in the definition of sufficient connectivity. For the definition of sufficient connectivity to be valid, sufficient connectivity may need to be defined such that if the connection from one node to another is determined to be sufficiently strong, then the connection from the other node to the original node (going in reverse) may also need to be sufficiently strong under the definition. Use of other connectivity criterion is contemplated.

Figure 3:
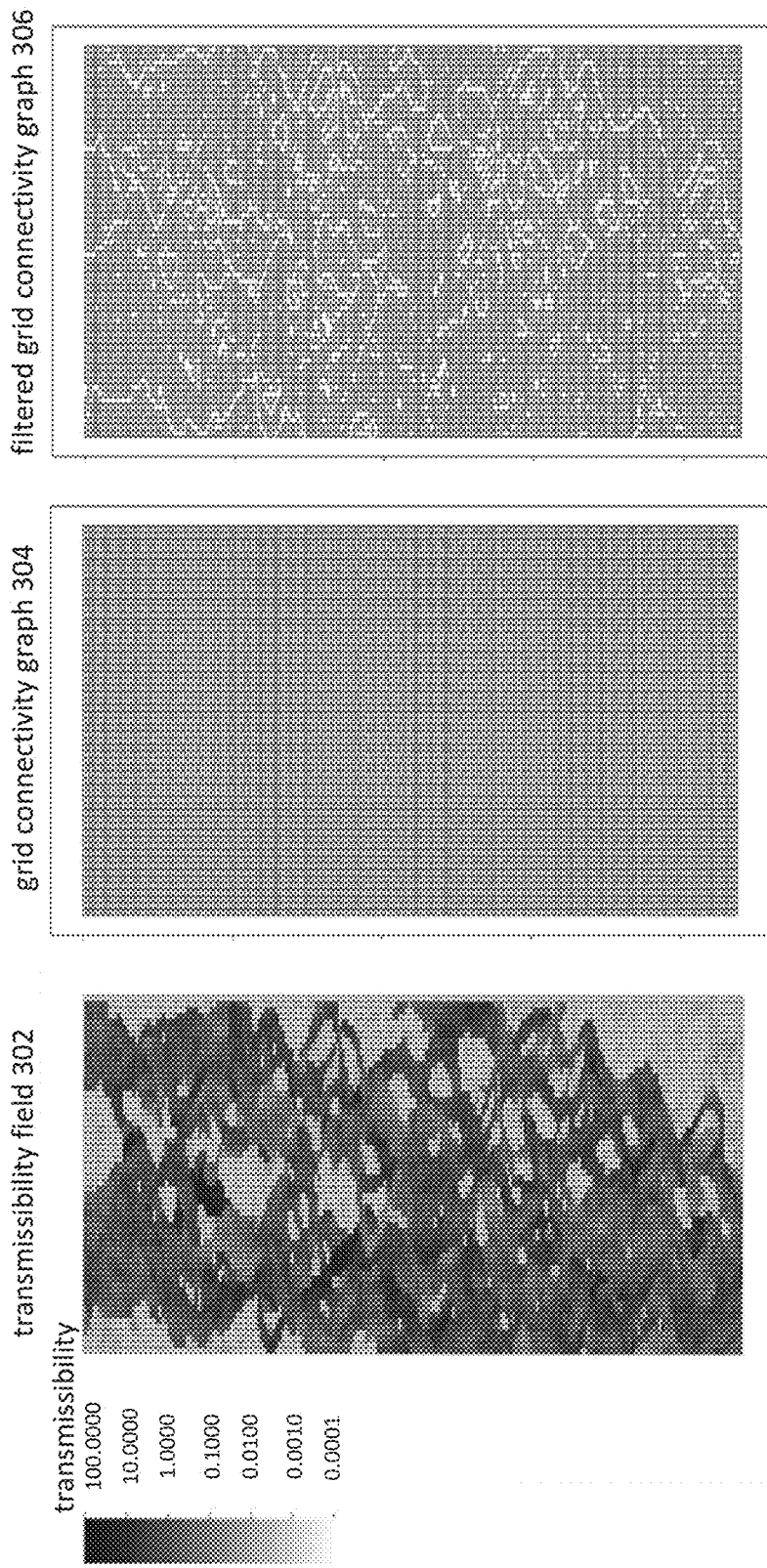
FIG. 3 illustrates examples of a transmissibility field, a grid connectivity graph, and a filtered grid connectivity graph.

FIG. 3 illustrates examples of a transmissibility field 302, a grid connectivity graph 304, and a filtered grid connectivity graph 306. The transmissibility field 302 may indicate values of transmissibility field in x direction. The grid connectivity graph 304 may be the original grid connectivity graph (before filtering). The edges of the grid connectivity graph 304 may be removed using a connectivity criterion, such as the connectivity criterion defined using equations (1)-(3). The filtering of the grid connectivity graph 304 using the connectivity criterion may result in generation of the filtered grid connectivity graph 306. As shown in FIG. 3, the filtering may have removed multiple edges in the grid connectivity graph 304 to generate the filtered grid connectivity graph 306.

Figure 4:
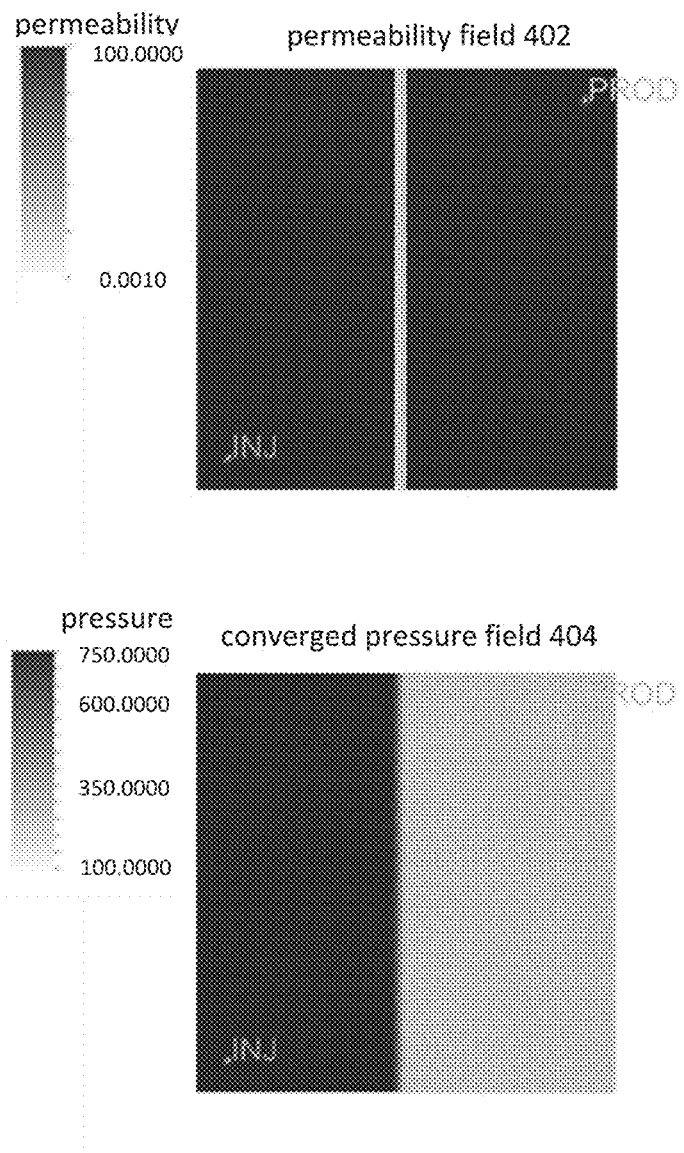
FIG. 4 illustrates examples of a permeability field and a converged pressure field.

For simulation of a subsurface region, such as a reservoir (e.g., a high-contrast heterogeneous reservoir), high contrast of transmissibility field may be a function of reservoir rock permeability field and computational grid discretization in the fine scale resolution (e.g., original subsurface representation). FIG. 4 illustrates examples of a permeability field 402 and a converged pressure field 404. The permeability field 402 and the converged pressure field 404 shown in FIG. 4 may be for a two-dimensional simulation in which there are two wells in the subsurface region: one injection and one producer. As shown in the permeability field 402, a low permeability barrier of 0.001 mD may exist in the middle of the simulation domain in the background permeability of 100 mD. This low permeability barrier may highly affect the simulated pressure field across the barrier, as shown in the converged pressure field 404. The converged pressure field 404 may show that the low permeability barrier causes high pressure values in the left side of the barrier and low pressure values in the right side of the barrier.

Simulation of the subsurface region, such as simulation using a multiscale pressure solver, may need to account for the sharp pressure field contrast in the fine scale resolution due to the underlying transmissibility field in a coarse scale grid resolution. Faster and more accurate simulation result may be obtained by designing coarse grids and basis function calculations to interpolate the solution contrast between fine and coarse scales, which enables creation of a better preconditioner in the multiscale pressure solver. To do so, the original grid connectivity graph may be filtered using a connectivity criterion.

Figure 5:
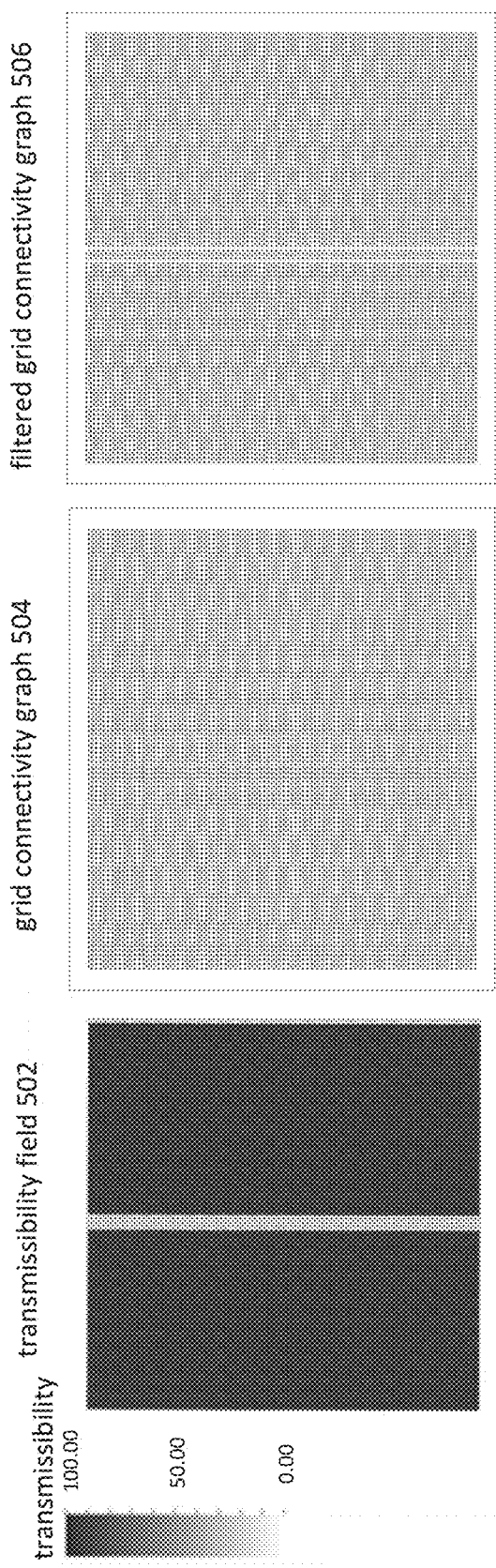
FIG. 5 illustrates examples of a transmissibility field, a grid connectivity graph, and a filtered grid connectivity graph.

FIG. 5 illustrates examples of a transmissibility field 502, a grid connectivity graph 504, and a filtered grid connectivity graph 506. The transmissibility field 502, the grid connectivity graph 504, and the filtered grid connectivity graph 506 may correspond to the simulation described with FIG. 4. The transmissibility field 502 may indicate values of transmissibility field in x direction. Low transmissibility in the middle of the transmissibility field 502 may be due to the low permeability barrier shown in FIG. 4. The grid connectivity graph 504 may be the original grid connectivity graph (before filtering). The edges of the grid connectivity graph 504 may be removed using a connectivity criterion, such as the connectivity criterion defined using equations (1)-(3). The filtering of the grid connectivity graph 504 using the connectivity criterion may result in generation of the filtered grid connectivity graph 506. The filtering may have removed multiple edges in the grid connectivity graph 504 around/near the low permeability barrier to generate the filtered grid connectivity graph 506.

The simulation component 106 may be configured to facilitate simulation of the subsurface region. Simulation of the subsurface region may include modeling of characteristics and/or changes in the subsurface region. Simulation of the subsurface region may include creation of a computer simulation of static and/or dynamic characteristics in the subsurface region. Simulation of the subsurface region may include modeling of events that occur in the subsurface region. For example, simulation of the subsurface region may include modeling of fluid movement in the subsurface region. Other types of simulation of the subsurface region are contemplated.

The simulation of the subsurface region may be facilitated based on the filtered grid connectivity graph and/or other information. The simulation component 106 may facilitate use of the filtered grid connectivity graph to perform simulation of the subsurface region (e.g., reservoir simulation). The simulation component 106 may facilitate use of information determined from the filtered grid connectivity graph to perform simulation of the subsurface region. Facilitating simulation of the subsurface region may include presenting the simulation on the display 14, (2) presenting information on the filtered grid connectivity graph/information determined from the filtered grid connectivity graph on the display 14, (3) providing information on the filtered grid connectivity graph/information determined from the filtered grid connectivity graph to one or more simulation processes, (4) performing simulation of the subsurface region using the information on the filtered grid connectivity graph/information determined from the filtered grid connectivity graph, (5) improving performance of the simulation of the subsurface region using information on the filtered grid connectivity graph/information determined from the filtered grid connectivity graph, and/or other facilitating of the simulation of the subsurface region.

In some implementations, facilitation of the simulation of the subsurface region based on the filtered grid connectivity graph may include generation of one or more coarse subsurface representations for the subsurface region based on the filtered grid connectivity graph and/or other information. A coarse subsurface representation may refer to a computer-generated representation of the subsurface region that has lower spatial resolution than the original subsurface representation. For example, the original subsurface representation may include a fine grid representation of subsurface properties at one scale, and the coarse subsurface representation may include a coarse grid representation of the subsurface properties at a larger scale. That is, one cell of the coarse subsurface representation may represent a larger portion of the subsurface region than one cell of the subsurface representation. A coarse subsurface representation may be an amalgamation of the subsurface representation. For example, the difference in scale between the subsurface representation and the coarse subsurface representation may be set at seventy-five, resulting in one coarse grid cell being an amalgamation of seventy-five cells of the subsurface representation. The difference in scale between the subsurface representation and the coarse subsurface representation may be determined based on default, user-input, and/or other information.

Figure 6:
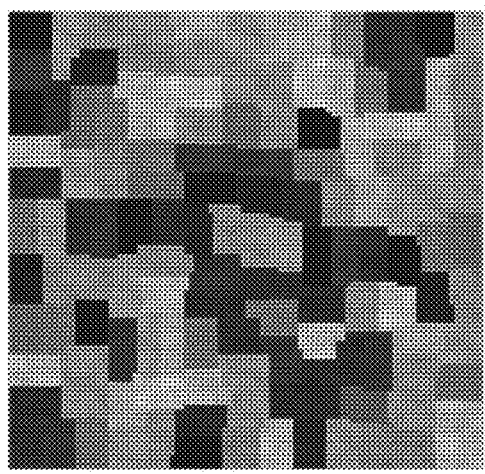
FIG. 6 illustrates examples of coarse subsurface representations.
Figure 6:
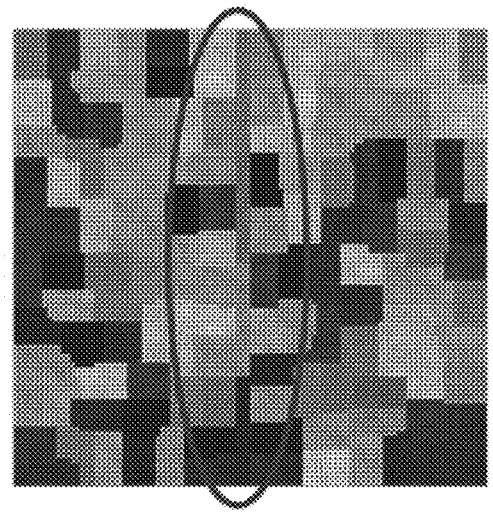

Using the filtered grid connectivity graph to generate a coarse subsurface representation may result in the coarse subsurface representation to more accurately representation subsurface properties of the subsurface region. For example, using the filtered grid connectivity graph to generate a coarse subsurface representation may result in the coarse subsurface representation to represent different permeability zones more accurately (e.g., low and high permeability zones). For example, FIG. 6 illustrates examples of coarse subsurface representations 602, 604. The coarse subsurface representation 602 may have been generated using the original grid connectivity graph (e.g., the grid connectivity graph 504 shown in FIG. 5) while the coarse subsurface representation 604 may have been generated using the filtered grid connectivity graph (the filtered grid connectivity graph 506 shown in FIG. 5). The coarse subsurface representation 602 generated without filtering of the grid connectivity graph may not recognize the boundary between the low and high permeability zones. The coarse subsurface representation 604 generated with filtering of the grid connectivity graph may recognize the boundary between the low and high permeability zones. That is, the coarse grids in the coarse subsurface representation 604, unlike the coarse grids in the coarse subsurface representation 602, may be confined in both low and high permeability zones. The coarse subsurface representation 604 may account for the coarse grid geometry confined in the low and high permeability zones.

In some implementations, the facilitation of the simulation of the subsurface region based on the filtered grid connectivity graph may further include generation of support regions for the coarse subsurface representation based on the filtered grid connectivity graph and/or other information. Support regions may be generated for individual cells in the coarse subsurface representation using the filtered grid connectivity graph. Support regions may determine the support of basis function for the simulation of the subsurface region. Support regions may define domains for the basis function which are not mapped to zero. Support regions may enable determination of the basis function. The basis function may be determined to be represented within the support region, but not outside the support region. Using the filtered grid connectivity graph to generate the support regions may result in better support regions (resulting in better performance) than using the original grid connectivity graph.

In some implementations, the facilitation of the simulation of the subsurface region based on the filtered grid connectivity graph may further include determination of basis function based on the filtered grid connectivity graph and/or other information. That is, in addition to using the filtered grid connectivity graph to generate the support regions, the filtered grid connectivity graph may be used to determine the basis function. The support regions may provide support for the basis function. Based on the support regions, the basis function may be determined (e.g., computed) via one or more methods (e.g., Restriction-Smoothed Basis functions method). The method for determining the basis function may utilize the filtered grid connectivity graph rather than the original grid connectivity graph. For example, a Jacobi smoother operator in the Restriction-Smoothed Basis functions method may utilize the filtered grid connectivity graph rather than the original grid connectivity graph. Using the filtered grid connectivity graph to determine the basis function may result in better basis function (resulting in better performance) than using the original grid connectivity graph.

Figure 7:
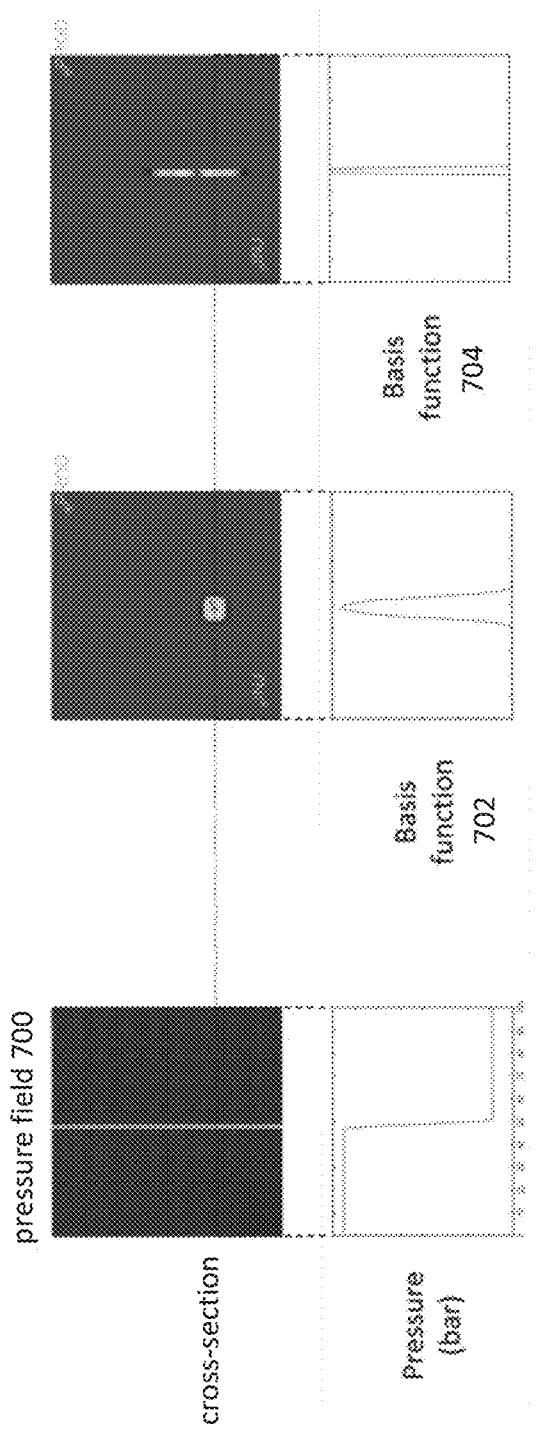
FIG. 7 illustrates example basis functions for a pressure field.

FIG. 7 illustrates example basis functions 702, 704 for a cross section of a pressure field 700. The basis function 602 may have been determined using the original grid connectivity graph (e.g., the grid connectivity graph 504 shown in FIG. 5) while the basis function 704 may have been determined using the filtered grid connectivity graph (the filtered grid connectivity graph 506 shown in FIG. 5). Use of the filtered grid connectivity graph to generate the support region and determine the basis function may result in the basis function 704 better capturing the sharp pressure field contrasts across the low permeability barrier than the basis function 702 generated using the original grid connectivity graph. Use of the filtered grid connectivity graph may prevent the basis function 704 from spreading out across the boundary formed by the low permeability barrier.

In some implementations, the facilitation of the simulation of the subsurface region based on the filtered grid connectivity graph may further include determination of one or more prolongation operators based on the basis function(s) and/or other information. Use of the basis function determined based on the filtered grid connectivity graph may enable better prolongation operation to be determined. For example, such determination of the prolongation operation using the basis function 704 that better captures the sharp pressure field contrasts across the low permeability barrier may produce better prolongation operator from the coarse scale pressure solution to the fine scale pressure solution in the multiscale pressure preconditioner. The prolongation operator may be needed to construct the linear solver preconditioner for solving pressure linear system (e.g., using Algebraic Multigrid solver). The prolongation operation may be used to change the original fine scale pressure metric into the coarse scale pressure metric for use in the simulation. The quality of the prolongation operation may be enhanced by accounting for the contrast of the underlying modeling characteristics (e.g., transmissibility field).

In some implementations, the facilitation of the simulation of the subsurface region based on the filtered grid connectivity graph may further include determination of one or more linear solver preconditioners based on the prolongation operator(s) and/or other information. A linear solver preconditioner may be used to condition a linear system to solve the linear system more efficiently. A linear solver preconditioner may enable solution to the linear system to be determined in a more conditioned/controlled way. A linear solver preconditioner may provide an approximate solver for the linear system. When solving a linear system using an iterative method, the number of iterations/rate of convergence may depend on the condition number of the matrix (ratio between largest and smallest eigenvalue). To accelerate convergence, a linear solver preconditioner may be used in every iteration of the iterative method. The use of the linear solver preconditioner may reduce the condition number of the matrix prior to the next iteration and may improve the convergence rate. That is, the facilitation of the simulation of the subsurface region based on the filtered grid connectivity graph may further include improvement of the convergence rate for the simulation based on the linear solver preconditioner and/or other information. This may allow for faster simulation of subsurface region. The simulation may be performed more quickly/with less computational resource by using the linear solver preconditioner, determined via filtering of the grid connectivity graph as described herein, to accelerate the convergence rate (reduce the number of iterations needed to find the solution). Filtering of the grid connectivity graph as described herein may improve the robustness of the linear solver preconditioner for use in the simulation.

For example, this approach may be used to perform fast evaluations of uncertainty quantification of reservoir model characterization, such as geology screening by flow simulation, automatic history matching and production optimizations with shorter turnaround time of flow simulations with multiscale sequential fully implicit (SFI) method. This approach may be used to accelerate field development planning (e.g., search for possible scenario of field development planning with large throughput of computation in the cloud computing with hundreds or thousands of reservoir model realizations). This approach may be used to run numerous (e.g., billion) cells model with geological special resolutions without upscaling the model and conduct flow simulation directly.

Figure 8:
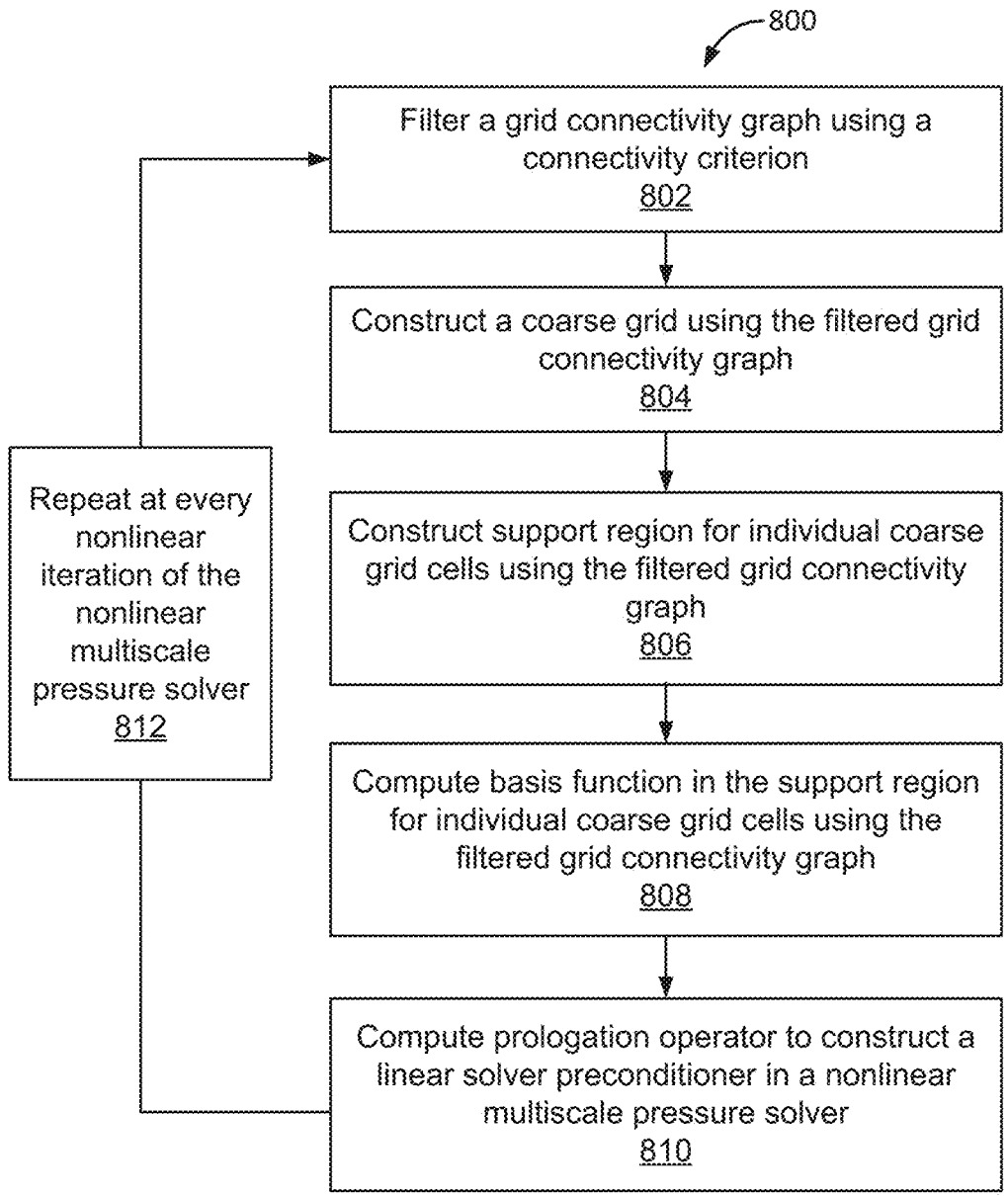
FIG. 8 illustrates an example process for computing a liner solver precondition.

FIG. 8 illustrates an example process 800 for computing a liner solver precondition. At a step 802, a grid connectivity graph (original grid connectivity graph) may be filtered using a connectivity criterion (e.g., definition of strongly coupled neighbors). At a step 804, a coarse grid (e.g., coarse subsurface representation) may be constructed using the filtered grid connectivity graph. At a step 806, support region for individual cells in the coarse grid may be constructed using the filtered grid connectivity graph. At a step 808, basis function may be computed in the support region for individual cells in the coarse grid using the filtered grid connectivity graph. At a step 810, prolongation operator may be computed to construct a linear solver preconditioner in a nonlinear multiscale pressure solver. At a step 812, the steps 802 through 810 may be repeated at every nonlinear iteration of the nonlinear multiscale pressure solver.

Figure 9:
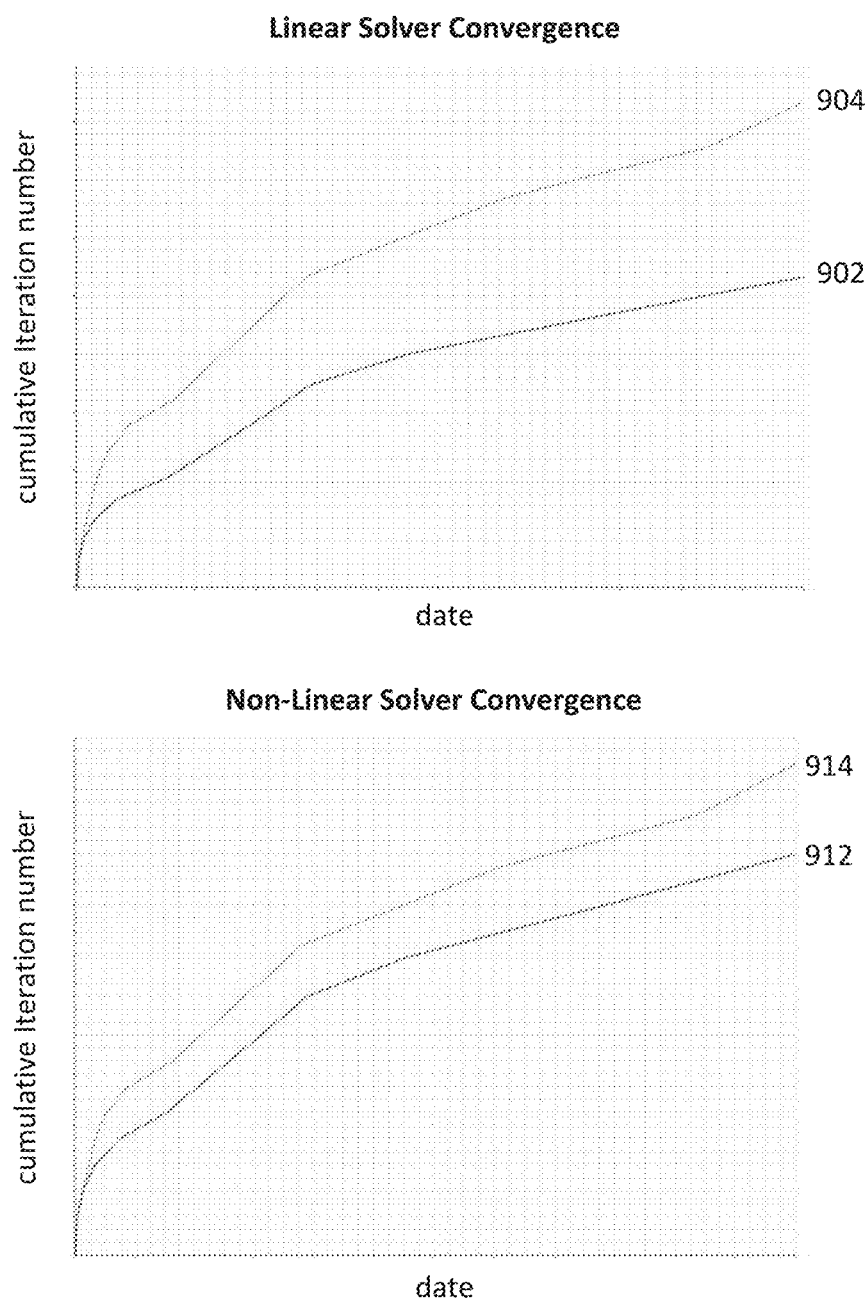
FIG. 9 illustrates linear and nonlinear iteration number comparison for a one-year simulation of a two-dimensional case.

FIG. 9 illustrates linear and nonlinear iteration number comparison for a one-year simulation of a two-dimensional case. Lines 902, 912 show multiscale pressure solver implementation using filtered grid connectivity graph as described herein. Lines 904, 914 show multiscale pressure solver implementation using original (non-filtered) grid connectivity graph. As shown in FIG. 9, convergence of both linear and nonlinear solvers of the multiscale pressure solver are accelerated with the same level of convergence tolerances by using the filtered grid connectivity graph.

Figure 10:
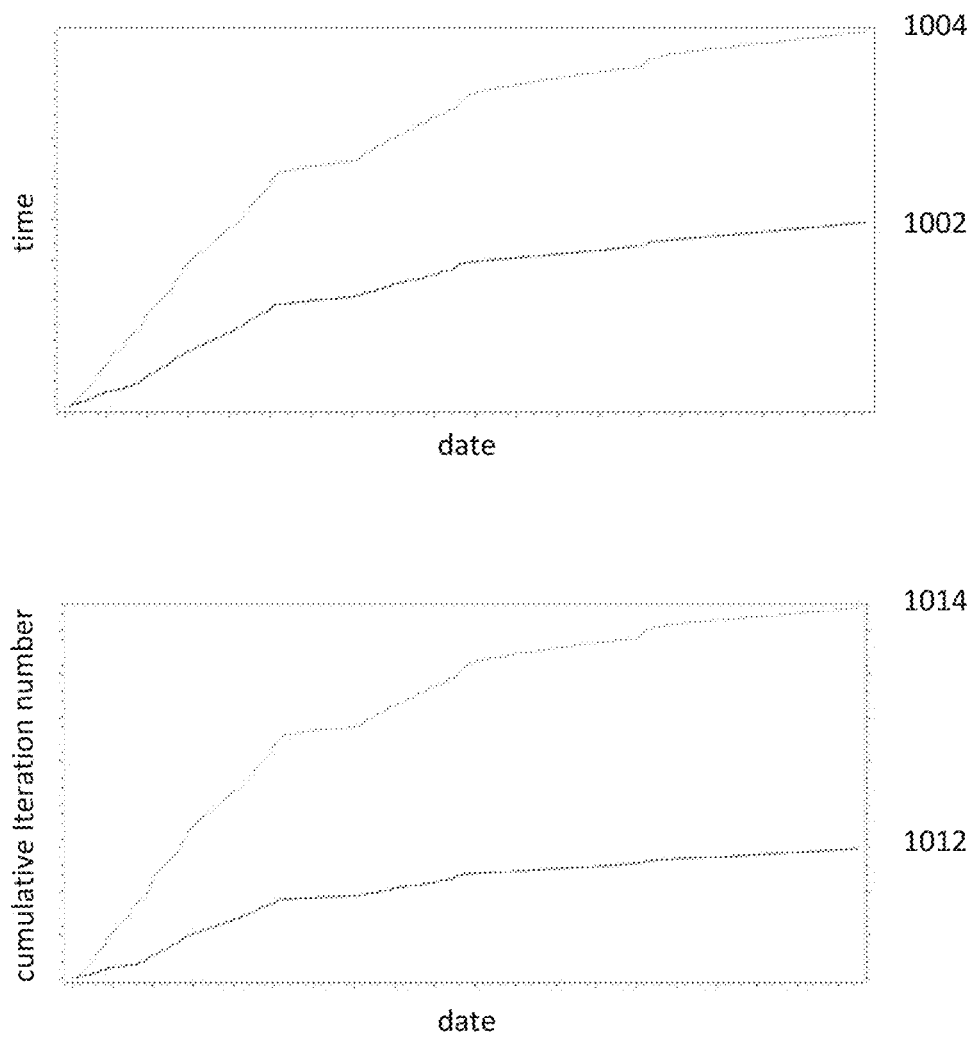
FIG. 10 illustrates an example comparison between use of filtered grid connectivity graph and non-filtered grid connectivity graph on CPU time and iteration numbers for a field model application

FIG. 10 illustrates an example comparison between use of filtered grid connectivity graph and non-filtered grid connectivity graph on CPU time and iteration numbers for a field model application. Lines 1002, 1012 show implementation using filtered grid connectivity graph as described herein. Lines 1004, 1014 show mu implementation using original (non-filtered) grid connectivity graph. As shown in FIG. 10, convergence is reached faster (in time and number of iteration) when using the filtered grid connectivity graph.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). A machine-readable medium may include non-transitory computer-readable medium. For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11. The system 10 may be implemented in a single computing device, across multiple computing devices, in a client-server environment, in a cloud environment, and/or in other devices/configuration of devices. The system 10 may be implemented using a computer, a desktop, a laptop, a phone, a tablet, a mobile device, a server, and/or other computing devices.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
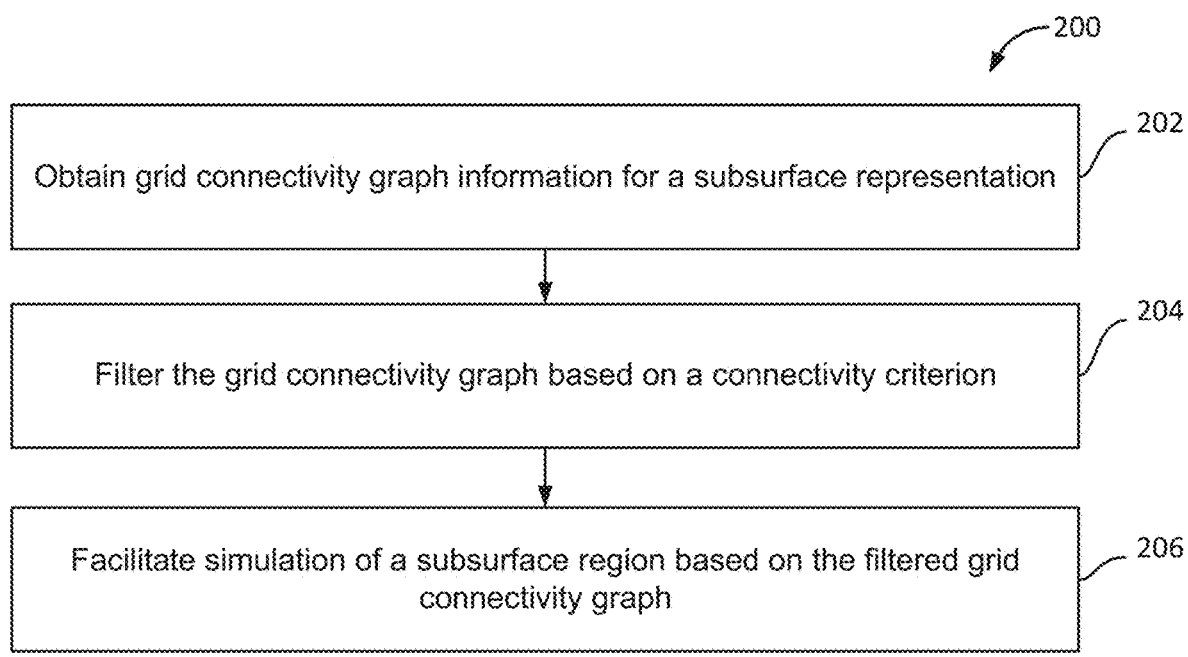
FIG. 2 illustrates an example method for accelerating reservoir simulation.

FIG. 2 illustrates method 200 for accelerating reservoir simulation. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, grid connectivity graph information for a subsurface representation and/or other information may be obtained. The subsurface representation may include cells that define subsurface configuration of a subsurface region. The grid connectivity graph information may define a grid connectivity graph for the subsurface representation. The grid connectivity graph may include nodes representing the cells within the subsurface representation and edges representing connectivity between the cells within the subsurface representation. In some implementations, operation 202 may be performed by a processor component the same as or similar to the graph component 102 (Shown in FIG. 1 and described herein).

At operation 204, the grid connectivity graph may be filtered based on a connectivity criterion and/or other information. In some implementations, operation 204 may be performed by a processor component the same as or similar to the filter component 104 (Shown in FIG. 1 and described herein).

At operation 206, simulation of the subsurface region may be facilitated based on the filtered grid connectivity graph and/or other information. In some implementations, operation 206 may be performed by a processor component the same as or similar to the simulation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for accelerating reservoir simulation, the system comprising:
one or more physical processors configured by machine-readable instructions to:
obtain grid connectivity graph information for a subsurface representation, the subsurface representation being a fine grid representation for a subsurface region, the subsurface representation including cells that define subsurface configuration of the subsurface region, the grid connectivity graph information defining a grid connectivity graph for the subsurface representation, the grid connectivity graph including nodes representing the cells within the subsurface representation and edges representing connectivity between the cells within the subsurface representation, wherein a low permeability barrier in the subsurface region causes a sharp pressure field contrast between low and high permeability zones in the fine grid representation for the subsurface region;
filter the grid connectivity graph based on a connectivity criterion, wherein filtering of the grid connectivity graph removes multiple ones of the edges around or near the low permeability barrier to generate the filtered grid connectivity graph, wherein the connectivity between the cells is defined by transmissibility values, wherein a definition of sufficient connectivity is defined based on a threshold value, and wherein the filtering of the grid connectivity graph comprises:

if a connection between given cells satisfies the definition of sufficient connectivity, the corresponding edge is retained in the grid connectivity graph; and if a connection between given cells does not satisfy the definition of sufficient connectivity, the corresponding edge is removed from the grid connectivity graph; and facilitate multiscale simulation of the subsurface region based on the filtered grid connectivity graph, the multiscale simulation of the subsurface region including simulation of the subsurface region using a multiscale pressure solver, wherein facilitation of the multiscale simulation of the subsurface region based on the filtered grid connectivity graph includes generation of a coarse subsurface representation for the subsurface region based on the filtered grid connectivity graph, the coarse subsurface representation being a coarse grid representation for the subsurface region, wherein generation of the coarse subsurface representation based on the filtered grid connectivity graph results in the coarse grid representation recognizing a boundary between the low and high permeability zones, wherein generation of the coarse grid representation comprises amalgamating cells of the fine grid representation based on the filtered grid connectivity graph, resulting in the coarse grid representation representing subsurface properties at a larger scale than the fine grid representation and resulting in the coarse grid representation recognizing the boundary between the low and high permeability zones.

2. The system of claim 1, wherein the grid connectivity graph is filtered according to the following equation:

$$t_{ij}^F = \begin{cases} t_{ij} & \text{if } f \in N_i^l(\varepsilon) \\ 0 & \text{otherwise} \end{cases}$$

where:
$t_{ij}$ is the transmissibility value between grid cells i and j before the filtering;
$t^F_{ij}$ is the transmissibility value between grid cells i and j after the filtering;
said definition of sufficient connectivity is defined by the following equation:

$$N_i^l(\varepsilon) = \{j : |t_{ij}| \geq \varepsilon \sqrt{t_{ii} t_{jj}}\} \cup \{i\}$$

$\varepsilon$ is said threshold value; and
if i≠j, $$t_{ii} = -\sum_{j=1, j \neq i}^{n_I} t_{ij}.$$

3. The system of claim 1, wherein the grid connectivity graph is filtered at every nonlinear iteration of the multiscale pressure solver.

4. The system of claim 1, wherein the facilitation of the simulation of the subsurface region based on the filtered grid connectivity graph further includes generation of support regions for the coarse subsurface representation based on the filtered grid connectivity graph.

5. The system of claim 4, wherein the facilitation of the simulation of the subsurface region based on the filtered grid connectivity graph further includes determination of basis function based on the filtered grid connectivity graph, wherein use of the filtered grid connectivity graph to determine the basis function prevents the basis function from spreading out across the boundary between the low and high permeability zones.

6. The system of claim 5, wherein the facilitation of the simulation of the subsurface region based on the filtered grid connectivity graph further includes determination of a prolongation operator based on the basis function.

7. The system of claim 6, wherein the facilitation of the simulation of the subsurface region based on the filtered grid connectivity graph further includes determination of a linear solver preconditioner in the multiscale pressure solver based on the prolongation operator, wherein the linear solver preconditioner increases convergence rates for the multiscale simulation of the subsurface region.

8. The system of claim 7, wherein use of the filtered grid connectivity graph results in the linear solver preconditioner decreasing time and computational resource required for the multiscale simulation of the subsurface region.

9. A method for accelerating reservoir simulation, the method comprising:
obtaining grid connectivity graph information for a subsurface representation, the subsurface representation being a fine grid representation for a subsurface region, the subsurface representation including cells that define subsurface configuration of the subsurface region, the grid connectivity graph information defining a grid connectivity graph for the subsurface representation, the grid connectivity graph including nodes representing the cells within the subsurface representation and edges representing connectivity between the cells within the subsurface representation, wherein a low permeability barrier in the subsurface region causes a sharp pressure field contrast between low and high permeability zones in the fine grid representation for the subsurface region;

filtering the grid connectivity graph based on a connectivity criterion, wherein filtering of the grid connectivity graph removes multiple ones of the edges around or near the low permeability barrier to generate the filtered grid connectivity graph, wherein the connectivity between the cells is defined by transmissibility values, wherein a definition of sufficient connectivity is defined based on a threshold value, and wherein the filtering of the grid connectivity graph comprises:

if a connection between given cells satisfies the definition of sufficient connectivity, the corresponding edge is retained in the grid connectivity graph; and if a connection between given cells does not satisfy the definition of sufficient connectivity, the corresponding edge is removed from the grid connectivity graph; and facilitating multiscale simulation of the subsurface region based on the filtered grid connectivity graph, the multiscale simulation of the subsurface region including simulation of the subsurface region using a multiscale pressure solver, wherein facilitating the multiscale simulation of the subsurface region based on the filtered grid connectivity graph includes generating a coarse subsurface representation for the subsurface region based on the filtered grid connectivity graph, the coarse subsurface representation being a coarse grid representation for the subsurface region, wherein generating the coarse subsurface representation based on the filtered grid connectivity graph results in the coarse grid representation recognizing a boundary between the low and high permeability zones, wherein generating the coarse grid representation comprises amalgamating cells of the fine grid representation based on the filtered grid connectivity graph, resulting in the coarse grid representation representing subsurface properties at a larger scale than the fine grid representation and resulting in the coarse grid representation recognizing the boundary between the low and high permeability zones.

10. The method of claim 9, wherein the grid connectivity graph is filtered according to the following equation:

$$t_{ij}^F = \begin{cases} t_{ij} & \text{if } f \in N_i^I(\varepsilon) \\ 0 & \text{otherwise} \end{cases}$$

where:
$t_{ij}$ is the transmissibility value between grid cells i and j before the filtering;
$t^F_{ij}$ is the transmissibility value between grid cells i and j after the filtering;
said definition of sufficient connectivity is defined by the following equation:

$$N_i^I(\varepsilon) = \left\{ j : |t_{ij}| \geq \varepsilon \sqrt{t_{ii} t_{jj}} \right\} \cup \{i\}$$

$\varepsilon$ is said threshold value; and
if i≠j, $$t_{ii} = -\sum_{j=1, j\neq i}^{n_I} t_{ij}.$$

11. The method of claim 9, wherein the grid connectivity graph is filtered at every nonlinear iteration of the multiscale pressure solver.

12. The method of claim 9, wherein the facilitating the simulation of the subsurface region based on the filtered grid connectivity graph further includes generating support regions for the coarse subsurface representation based on the filtered grid connectivity graph.

13. The method of claim 12, wherein the facilitating the simulation of the subsurface region based on the filtered grid connectivity graph further includes determining basis function based on the filtered grid connectivity graph, wherein use of the filtered grid connectivity graph to determine the basis function prevents the basis function from spreading out across the boundary between the low and high permeability zones.

14. The method of claim 13, wherein the facilitating the simulation of the subsurface region based on the filtered grid connectivity graph further includes determining a prolongation operator based on the basis function.

15. The method of claim 14, wherein the facilitating the simulation of the subsurface region based on the filtered grid connectivity graph further includes determining a linear solver preconditioner in the multiscale pressure solver based on the prolongation operator, wherein the linear solver preconditioner increases convergence rates for the multiscale simulation of the subsurface region.

16. The method of claim 15, wherein use of the filtered grid connectivity graph results in the linear solver preconditioner decreasing time and computational resource required for the multiscale simulation of the subsurface region.

17. A non-transitory computer-readable medium having computer-executable instructions stored thereon which, when executed by a computer, cause the computer to perform a method for accelerating reservoir simulation, the method comprising:
obtaining grid connectivity graph information for a subsurface representation, the subsurface representation being a fine grid representation for a subsurface region, the subsurface representation including cells that define subsurface configuration of the subsurface region, the grid connectivity graph information defining a grid connectivity graph for the subsurface representation, the grid connectivity graph including nodes representing the cells within the subsurface representation and edges representing connectivity between the cells within the subsurface representation, wherein a low permeability barrier in the subsurface region causes a sharp pressure field contrast between low and high permeability zones in the fine grid representation for the subsurface region;
filtering the grid connectivity graph based on a connectivity criterion, wherein filtering of the grid connectivity graph removes multiple ones of the edges around or near the low permeability barrier to generate the filtered grid connectivity graph, wherein the connectivity between the cells is defined by transmissibility values, wherein a definition of sufficient connectivity is defined based on a threshold value, and wherein the filtering of the grid connectivity graph comprises:
if a connection between given cells satisfies the definition of sufficient connectivity, the corresponding edge is retained in the grid connectivity graph; and
if a connection between given cells does not satisfy the definition of sufficient connectivity, the corresponding edge is removed from the grid connectivity graph; and
facilitating multiscale simulation of the subsurface region based on the filtered grid connectivity graph, the multiscale simulation of the subsurface region including simulation of the subsurface region using a multiscale pressure solver, wherein facilitating the multiscale simulation of the subsurface region based on the filtered grid connectivity graph includes generating a coarse subsurface representation for the subsurface region based on the filtered grid connectivity graph, the coarse subsurface representation being a coarse grid representation for the subsurface region, wherein generating the coarse subsurface representation based on the filtered grid connectivity graph results in the coarse grid representation recognizing a boundary between the low and high permeability zones, wherein generating the coarse grid representation comprises amalgamating cells of the fine grid representation based on the filtered grid connectivity graph, resulting in the coarse grid representation representing subsurface properties at a larger scale than the fine grid representation and resulting in the coarse grid representation recognizing the boundary between the low and high permeability zones.

18. The non-transitory computer-readable medium of claim 17, wherein the grid connectivity graph is filtered according to the following equation:

$$t_{ij}^F = \begin{cases} t_{ij} & \text{if } f \in N_i^l(\varepsilon) \\ 0 & \text{otherwise} \end{cases}$$

where:
- $t_{ij}$ is the transmissibility value between grid cells i and j before the filtering;
- $t_{ij}$ is the transmissibility value between grid cells i and j after the filtering;
- said definition of sufficient connectivity is defined by the following equation:

$$N_i^l(\varepsilon) = \{j : |t_{ij}| \geq \varepsilon \sqrt{t_{ii} t_{jj}}\} \cup \{i\}$$

$\varepsilon$ is said threshold value; and
if i≠j, $$t_{ii} = -\sum_{j=1, j \neq i}^{n_l} t_{ij}.$$

19. The non-transitory computer-readable medium of claim 17, wherein the grid connectivity graph is filtered at every nonlinear iteration of the multiscale pressure solver.

20. The non-transitory computer-readable medium of claim 17, wherein the facilitation of the simulation of the subsurface region based on the filtered grid connectivity graph further includes generation of support regions for the coarse subsurface representation based on the filtered grid connectivity graph.

\* \* \* \* \*